June 6, 1939.  F. TINTNER  2,161,541
TRANSPORT APPARATUS FOR STRETCHERS AND THE LIKE
Filed Jan. 21, 1938   2 Sheets-Sheet 1
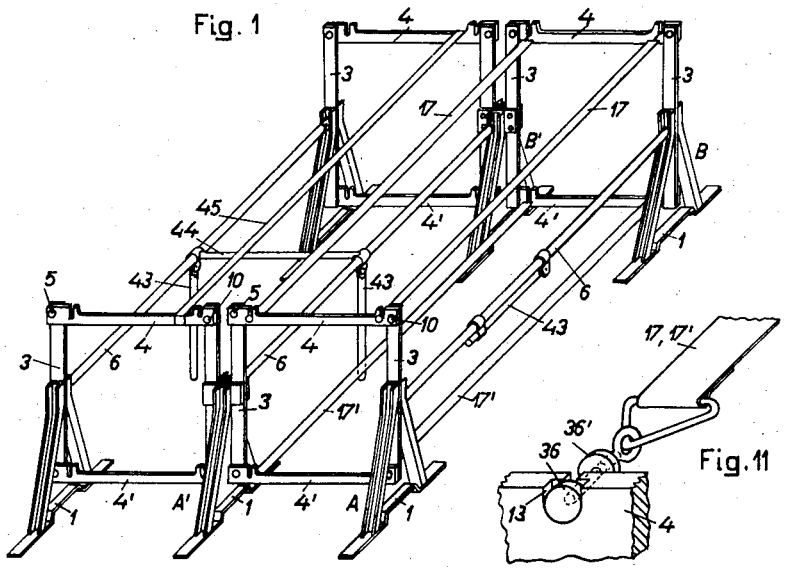
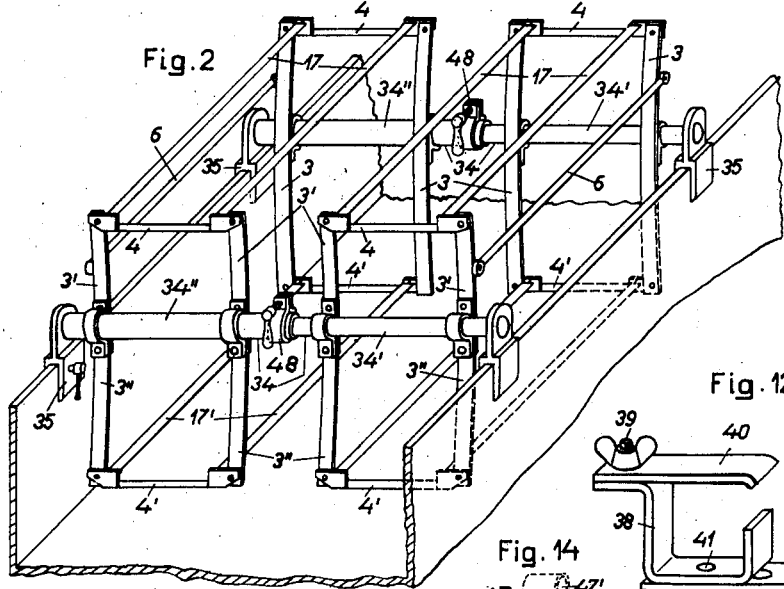
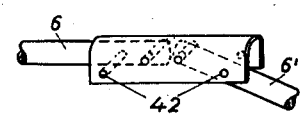
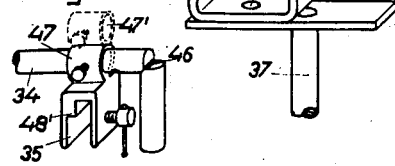
F. Tintner
INVENTOR
By Glascock Downing Seebold
Attys.

June 6, 1939.                F. TINTNER                2,161,541
TRANSPORT APPARATUS FOR STRETCHERS AND THE LIKE
Filed Jan. 21, 1938          2 Sheets-Sheet 2
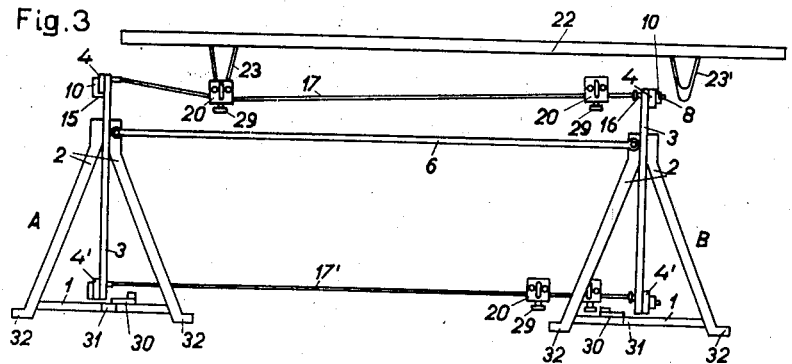
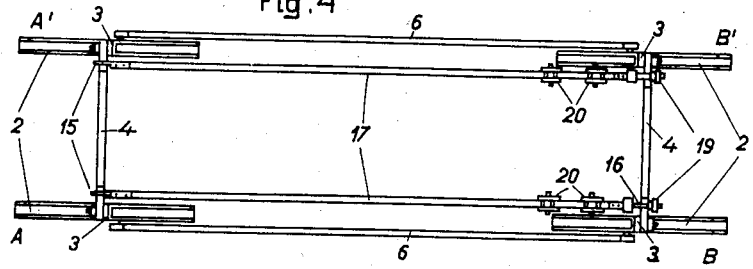
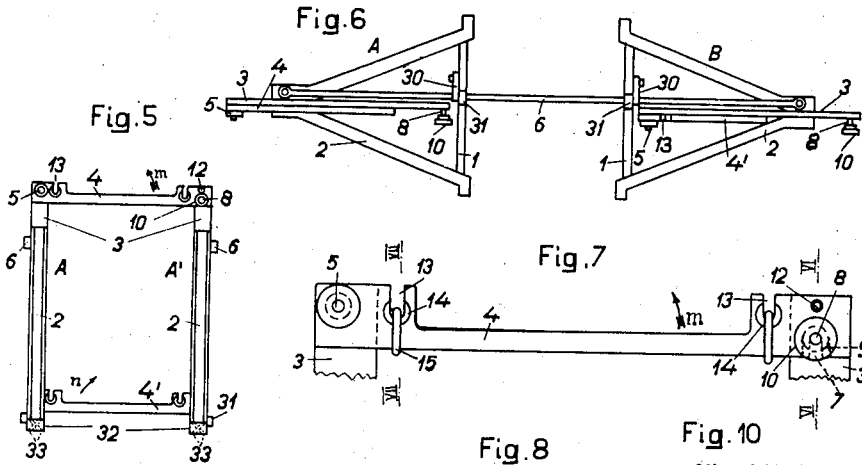
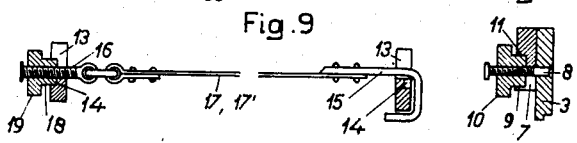
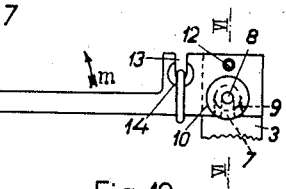
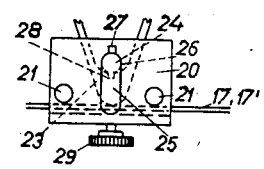

Patented June 6, 1939

2,161,541

UNITED STATES PATENT OFFICE 2,161,541

TRANSPORT APPARATUS FOR STRETCHERS AND THE LIKE

Fritz Tintner, Vienna, Austria

Application January 21, 1938, Serial No. 186,227
In Austria January 29, 1937

20 Claims. (Cl. 296—19)

This invention relates to a transport apparatus for holding stretchers and the like.

Appliances for the transportation of the sick on which the stretchers were resiliently suspended, have already been proposed.

The present invention provides a transport apparatus in which the supports for stretchers and the like are supported by up-right bar or leaf springs or the like in order to obtain damped springing. Steel bands or the like, co-acting with the springs (for example secured on rods or the like mounted on the springs), are preferably used as supports for the stretchers.

In order more clearly to understand the invention, reference is made to the accompanying drawings, which illustrate diagrammatically and by way of example, several embodiments thereof, and in which:

Figs. 1 and 2 are perspective views of various embodiments of the apparatus when erected;

Figs. 3 and 5 are side-views and Fig. 4 is a plan-view of another embodiment;

Fig. 6 shows the apparatus folded up;

Figs. 7 to 14 represent details on a larger scale.

Between U-irons (joined together by a cross-bar 1) of the pedestals A, A', B, B'—each pair of which lying in one plane are connected together in articulated fashion by a longitudinal bar 6— are secured the leaf springs 3 or the like (Fig. 1), while, in order to regulate the tension of the bar springs, the longitudinal bar 6 may be composed of two bars 6, 6' or the like united by a link and secured in position by means of pins, screws or the like 42 (Fig. 13). The ends of the springs 3 of the pedestals A, B are joined to the ends of the springs 3 of the opposite pedestals A', B' by cross-bars 4, 4', which may be rocked around screw-bolts 5. The free end of each cross-bar 4, 4' is provided with a slit 7 open at the bottom and rests on a screw-bolt 8 fastened in every spring 3 (Fig. 7 and the corresponding section along the plane VI—VI, Fig. 8). The projection 9 of the corresponding nut 10 enters the recess 11 and secures each cross-bar 4, 4' in its position as soon as the nut 10 is tightened. When it is desired to rock the cross-bar 4, 4' around the bolt 5, the nut 10 is screwed out as far as possible. A pin 12, fitting into a perforation of the cross-bars 4, 4', is secured at the tops on the springs 3 of the pedestals A, B, and at the bottom on the springs 3 of the pedestals A', B'. If the top cross-bar 4 is rocked around the screw 5 in the direction of the arrow $m$ through an angle of 270°, it will lie parallel to the spring 3. The bottom cross-bar 4' may be rocked through an angle of 90° in the direction of the arrow $n$, until it lies parallel to the spring 3. The cross-bars 4, 4' have indentations 13 and recesses 14 (Fig. 7 and the corresponding section along the plane VII—VII, shown in Fig. 9); in the former are inserted the hooks 15 and the screw-bolts 16 respectively, which are fastened to the support bands 17, 17' which are advantageously of sheet steel, while in the latter lie the nuts 19, the projections 18 of which fit into the recesses 14. A plurality of indentations 13 may be disposed side by side, to enable the support bands to be secured at various distances and thus the stretcher width to be adjusted. The tension of the support bands 17, 17' and springs 3 may be regulated by adjustment of the nuts 19. However, the bands 17, 17' may also be provided at their ends with clamps 36, for example, by means of which the tension of the bar springs may be regulated depending on whether the disc 36 or the disc 36' is inserted in the indentation 13 (see Fig. 11). On each band or support band 17, 17' are mounted two sliding members 20 slidably hanging by means of bolts 21 on said bands. When the stretcher is to be secured on the apparatus the front stretcher feet 23 are first placed in the sliding members 20 and secured in position by pushing the bolt 24, which is provided with a rectangularly bent handle 25, through the holes 26 (Fig. 10). The hole 26 shown in Fig. 10 is also provided with a slot 27 through which is pushed the snout 28 of the bolt 24. Its weight turns the handle 25 downwards, carrying the snout 28 with it, so that the bolt cannot fall out of the hole 26. The stretcher 22 is now pushed along the bands 17 and 17' until the rear feet 23' can be placed in the sliding members 20 which are still free and be secured therein in the aforedescribed manner (see Figs. 3 and 4). The screws 29 on the sliding members 20 serve to press the bands 17, 17' against the stretcher feet 23, 23'. In order to secure the pedestals A, A', B, B' on wooden floors, for example, two intercrossing guides 33 for the nails or other fastening means, for example screws, to be driven into the wood are provided in their lugs 32 (see Fig. 5).

In the embodiment according to Fig. 2, two pairs of upright bar springs 3 are mounted on each carrier beam 34 (for example a tube), which consists of two or more members 34', 34" relatively slidable (for example in telescopic fashion) and capable of being secured by means of a clamp connection member 48, each two opposite springs—or more conveniently the ends of the carrier beams 34—being joined together in articulated fashion by longitudinal bars 6.

The springs 3 are preferably composed of at least two separate parts 3', 3'', while it is also possible to secure a plurality of spring bands or the like one over the other, i. e. to assemble the spring from a plurality of layers of spring plates or the like.

The carrier beam may be provided at its ends with clamps or the like 35 for securing to the wall of the vehicle, which clamps may be slidably or, if desired, also rotatably mounted. The beam end may also be so formed, for example with a hinge 46, that it can be folded over in narrower vehicles. It is advantageous to provide the fastening clamps with two or more clamp sleeves 47, 47' one above the other, by means of which the clamp may be mounted at different heights on the carrier beam, whereby it is also possible to mount the apparatus at different heights on the vehicle wall or the like (see Fig. 14). This may also be rendered possible by providing the side wall of the clamp with an internal projection or "heel" 48', whereby it may also be supported by means of said "heel" (i. e. at a higher level) on the top edge of the vehicle wall or the like and clamped there in position. If desired, the jaw of the clamp may be made movable and articulated, so that it will fit inclined vehicle's walls, for example. The clamps may advantageously be mounted on a rod or the like rotatably pivoted on the carrier beams, in such a way as to be fixable at any height, whereby their position may be adjusted within wide limits to the height of the vehicle wall. One end of the carrier beam may also be supported on a pedestal, whereby the apparatus, as such, may be used in vehicles of different widths.

According to Fig. 12, hooks 38 are eccentrically mounted, in such a way as to rotate around the axle 37 and 41, on the guide rod 37 serving as carrier for the stretcher cross-beams and resiliently supported in any manner, for example mounted on the bar spring 3, on which hooks the stretcher cross-beams are placed and secured by means of the plate 40 which can be secured in position by means of screws 39, whereby various stretcher widths can be obtained by turning the hooks.

In order to utilise the stretchers as seating accommodation, a folding support 43 and cross-support 44 are provided, while a belt 45 mounted on the cross-bars can act as back-rest. If desired, three stretchers may also be mounted one above the other.

After unscrewing the nuts 10 and removing the bands 17, 17', the cross-bars 4, 4' may be laid against the springs 3 (see Fig. 6). The pedestals A, B and A', B' hinged to a longitudinal rod 6 may then be folded up in the manner illustrated in Fig. 6. The longitudinal rods 6 are held by the hooks 31 mounted on the cross-bars 1 and secured in position by bolts or eccentric pieces 30 secured to the same cross-bars. The apparatus may be dismounted into two entirely identical parts, consisting of the members A, B, 6, 4, 4' and A', B', 6, 4, 4' respectively. These parts require only very little space when stored.

I claim:

1. A transport apparatus for holding and bearing stretchers for the sick, comprising stretcher carriers and upright springs supporting said carriers and being so arranged and constructed as to be deflected in a substantially horizontal direction when said carriers are burdened.

2. A transport apparatus for holding and bearing stretchers for the sick, comprising stretcher carriers and upright leaf springs supporting said carriers and being so arranged to be deflected in a substantially horizontal direction under the weight of the burdened stretcher carriers.

3. A transport apparatus for holding and bearing stretchers for the sick, comprising horizontally extending bands arranged as stretcher carriers and upright springs supporting said bands resiliently and being so constructed and arranged as to be deflected in a substantially horizontal direction when the said carriers are burdened.

4. A transport apparatus for holding and bearing stretchers for the sick, comprising horizontally arranged bands arranged as stretcher carriers and upright leaf springs supporting said bands and being so arranged as to be deflected in a substantially horizontal direction under the weight of the burdened bands.

5. A transport apparatus for holding and bearing stretchers for the sick, comprising stretcher carriers, upright leaf springs supporting said carriers, and cross-bars joining the ends of said springs together in pairs.

6. A transport apparatus as claimed in claim 5, wherein the said cross-bars are each pivoted at one end to one spring of a pair of leaf springs and detachably joined at the other end to the other spring of said pair.

7. A transport apparatus for holding and bearing stretchers for the sick, comprising bands arranged as stretcher carriers, upright leaf springs supporting said bands resiliently and cross-bars joining the end of said springs together in pairs and having a plurality of indentations for mounting the said bands at various distances from one another.

8. In an apparatus as claimed in claim 3, means whereby the tension of the said bands may be regulated.

9. In an apparatus as claimed in claim 4, sliding members suspended on the said bands and constructed so as to permit the feet of the stretcher to rest detachably on said members.

10. In an apparatus as claimed in claim 4, sliding members suspended on the said bands and constructed so as to permit the feet of the stretcher to rest detachably on the said members, and fastening means provided on said members for having the bands pressed against the feet of the stretcher.

11. A transport apparatus for holding and bearing stretchers for the sick, comprising stretcher carriers, upright leaf springs supporting said carriers, and at least two relatively slidable members whereon the said springs are mounted.

12. A transport apparatus for holding and bearing stretchers for the sick, comprising stretcher carriers, upright leaf springs supporting said carriers, a supporting member on which said springs are mounted, clamps for fastening said supporting member on the wall of a vehicle, and means permitting said member to be fastened to the wall at various heights.

13. A transport apparatus as claimed in claim 12, wherein said clamps are provided with at least two clamp sleeves disposed one above the other.

14. A transport apparatus as claimed in claim 12, wherein the said supporting member for the springs has the form of a beam adapted to be folded over.

15. A transport apparatus for holding and bearing stretchers for the sick, comprising stretcher carriers, upright leaf springs supporting said carriers on both ends, supporting members on which said springs are mounted, and longitudinal rods parallel to said carriers, the end of each of said rods being articulated to said springs.

16. A transport apparatus as claimed in claim 15, wherein each of the said longitudinal rods is composed of two separate parts articulated to one another.

17. A transport apparatus for holding and bearing stretchers for the sick, comprising means for the support of the setretchers and a guide rod on which said means are mounted eccentrically and rotatably, said guide rod being resiliently supported and arranged to act as a carrier for the cross-beams of the stretcher.

18. In an apparatus as claimed in claim 1, a folding support and a transverse support constructed and arranged so as to permit the stretchers to be used as seating accommodation, and a strap arranged to be used as back-rest.

19. A transport apparatus for holding and bearing stretchers for the sick, comprising stretcher carriers, upright leaf springs supporting said carriers, and pedestals whereon said springs are mounted, said leaf springs being so arranged as to be deflected in a substantially horizontal direction under the weight of the burdened stretcher carriers.

20. In a transport apparatus as claimed in claim 19, fastening means adapted to secure the said pedestals to the floor and intercrossing guides provided for on lugs of the pedestals for the putting in of said fastening means.

FRITZ TINTNER.